S. W. Brooks.
Preparing Blocks for Wood Pavements.
No. 120,237.  Patented Oct. 24, 1871.
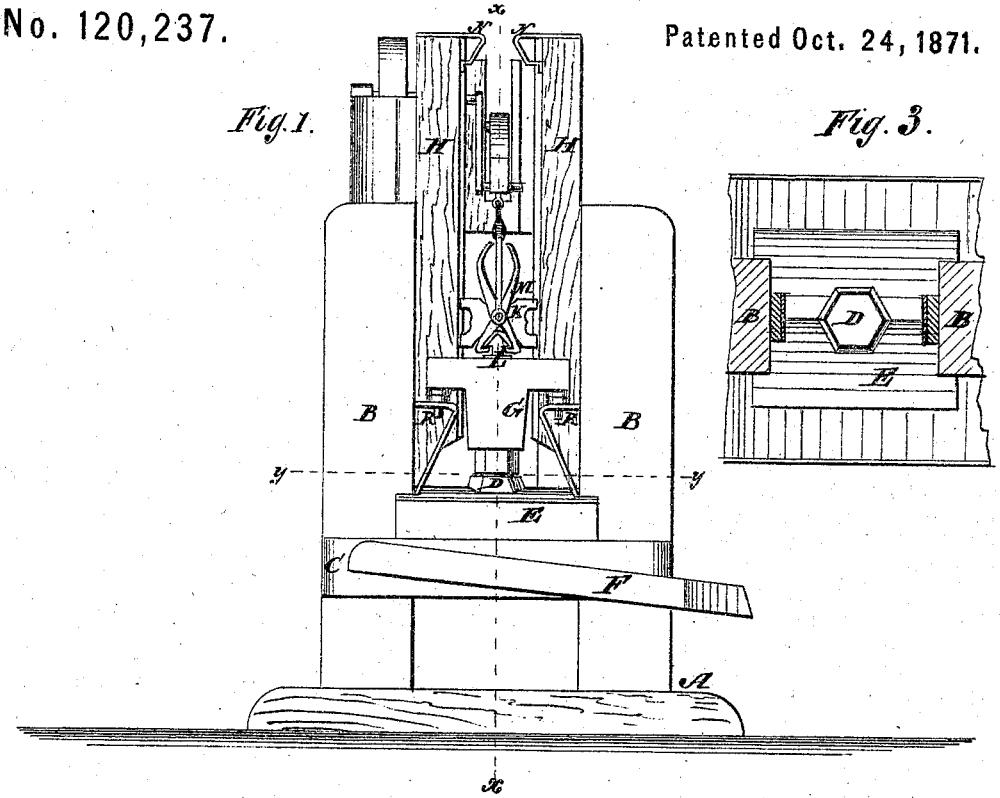
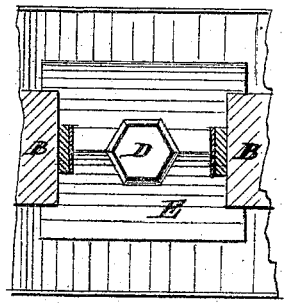
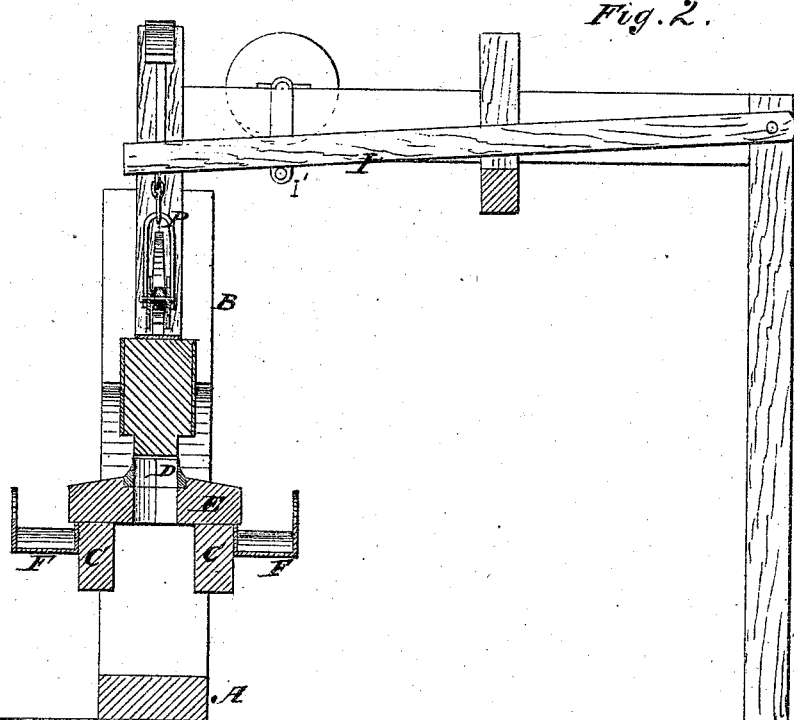
Witnesses  
E. Wolff  
Wm. H. C. Smith
Inventor:  
S. W. Brooks  
pr. Munn & Co  
Attorneys.

UNITED STATES PATENT OFFICE.

SAMUEL WALLACE BROOKS, OF BROWNSVILLE, TEXAS.

IMPROVEMENT IN MACHINES FOR MAKING PAVING-BLOCKS.

Specification forming part of Letters Patent No. 120,237, dated October 24, 1871.

*To all whom it may concern:*

Be it known that I, SAMUEL WALLACE BROOKS, of Brownsville, in the county of Cameron and State of Texas, have invented a new and useful Improvement in a Paving-Block Machine; and I do hereby declare that the following is a full, clear, and exact description thereof, which will enable others skilled in the art to make and use the same, reference being had to the accompanying drawing forming part of this specification.

My invention consists in combining certain suitably-constructed instrumentalities for cutting paving-blocks, as hereinafter fully described and subsequently pointed out in the claim.

In the accompanying drawing, Figure 1 represents a front elevation of the machine. Fig. 2 is a vertical longitudinal section of Fig. 1 taken on the line $x\ x$. Fig. 3 is a horizontal section giving a detailed view of the cutting-knife, the section being on the line $y\ y$ of Fig. 1.

Similar letters of reference indicate corresponding parts.

A is the base or platform. B B are two strong upright posts securely confined together by the transverse pieces C C. D is the cutting-knife, which is a hexagon in shape in this example of my invention; but I do not confine myself to that particular shape. E is the bed-plate which supports the knife, and through which the blocks are discharged as they are cut. The chips or pieces split from the block slide from the bed-plate and drop into the inclined spout F, from which they are discharged onto the platform. The block to be cut into the required shape, after being sawed from the timber to the required length, is placed upon the knife. G is a drop-weight which runs between and is guided by the uprights H H, which guides are securely fastened to the posts B B. This weight is operated or raised by means of the bar I, which is pivoted to the frame at the point J. The mechanism for attaching the cross-head K to the weight, and for detaching it, is similar to that employed in pile-driving machines. L is an arrow-headed hook on the weight. M is the grapple, and N N are the inclines, by means of which the grapple is detached from the weight when the latter has been raised. The cross-head confines the parts of the grapple, and runs in ways on the guides H H. The cross-head is connected with the end of the bar I by the bail P. The end of the bar may be raised by means of a belt operating on a crank-pulley or in any other suitable manner. The weight may be raised by means of a simple cord and pulley without the bar I. R represents the buffers, which are attached to the posts B B and supported by the bed for receiving the weight when it drops. These buffers should be provided with leather or some elastic substance to relieve or lessen the force of the blow and prevent injury to the knife.

When the timber has been cut up to the required lengths the blocks are placed on the cutter or knife with the grain of the wood parallel with the line of motion of the weight, and is forced through the knife at a single blow, ready for use. Blocks for wooden pavements may in this manner be prepared in the most perfect and expeditious manner.

Having thus described my invention, I claim as new and desire to secure by Letters Patent—

The tubular block-cutter D, top-beveled and tubular support E, and the downwardly-inclined spout F, combined, as described, with a drop-weight, G, for the purpose specified.

SAMUEL WALLACE BROOKS.

Witnesses:
HENRY A. MALTBY,
JAMES McGRATH.

(174)